United States Patent Office 3,369,195
Patented Feb. 13, 1968

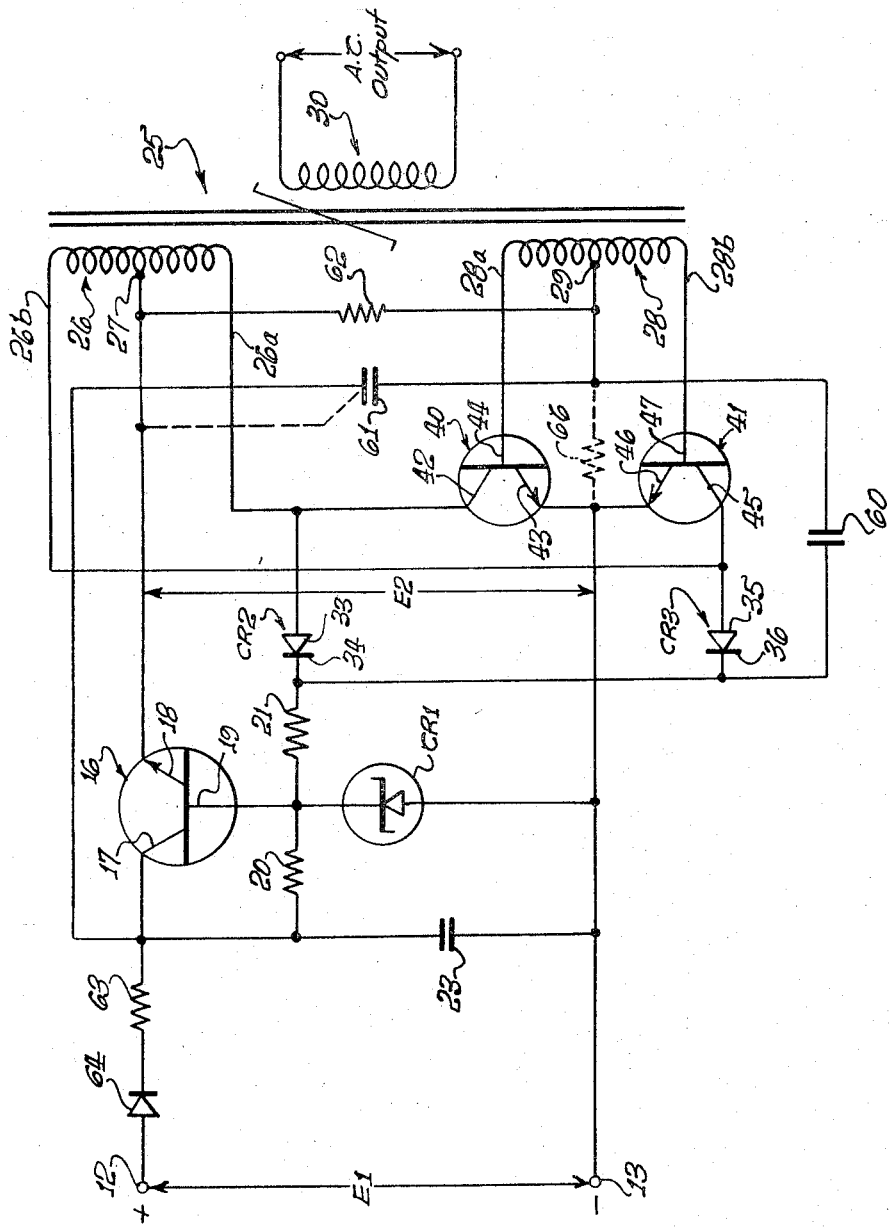

3,369,195
STABILIZATION OF VOLTAGE-REGULATED
ELECTRONIC CONVERTERS
Richard J. Zollinger, Sierra Madre, and Robert F. Easton, Pasadena, Calif., assignors to Electro-Optical Systems, Inc., Pasadena, Calif., a corporation of California
Filed Oct. 20, 1966, Ser. No. 588,072
10 Claims. (Cl. 331—113)

This invention relates to the stabilization of voltage-regulated electronic converter systems and more particularly to circuitry for the reduction of transient voltage spikes therein.

This invention is directed toward the reduction of transient voltage spikes occurring in converters of the type wherein the D.C. voltage powering a transistorized switching oscillator is regulated by means including a series regulator and a voltage reference control device connected to the series regulator, and full wave rectifier means connected to the switching oscillator and to the voltage reference control device to apply to the voltage reference control device a constant current derived from oscillations of the switching oscillator. Such a converter is described in co-pending U.S. patent application Ser. No. 395,130, filed Sept. 9, 1964, now Patent No. 3,336,-521, issued Aug. 15, 1967, by Robert H. Russell, entitled "Converter/Regulator Feedback Reference," and assigned to the present assignee. The present invention stabilization circuitry has been found particularly suitable for use in the converter system of the above-referenced patent application, a greater than 80 percent reduction in spike amplitude having been achieved. Accordingly, the present invention will be described with reference to the particular circuitry of the above-referenced patent application.

With reference to that particular circuitry, the present invention comprises a first capacitance connected between the output of the full wave rectifier means and the switching oscillator, a resistance connected between the center taps of the input and feedback windings of a switching oscillator transformer, and a second capacitance connected betwee the center tap of the feedback winding and the input of the series regulator.

It is therefore an object of the present invention to provide a circuit means for stabilization of voltage-regulated electronic converters.

It is also an object of the present invention to provide circuitry for the reduction of transient voltage spikes in voltage-regulated electronic converters.

It is a further object of the present invention to provide circuitry for the reduction of transient voltage spikes in converter systems utilizing regulation of the D.C. voltage powering a transistorized switching oscillator.

It is another object of the present invention to provide circuitry for the reduction of transient voltage spikes in converters utilizing regulation of the D.C. voltage powering a transistorized switching oscillator, and including full wave rectifier means interconnecting the switching oscillator and the voltage regulation means.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing there is shown a schematic diagram of an electronic converter system incorporating the present invention stabilization circuitry.

Turning now to the drawing, the illustrated system utilizes three transistors indicated by the reference numerals 16, 40 and 41, the transistor 16 having a collector electrode 17, an emitter electrode 18, and a base electrode 19. Transistor 40 has a collector electrode 42, an emitter electrode 43 and a base electrode 44. Transistor 41 has a collector electrode 45, an emitter electrode 46 and a base electrode 47. The circuit is powered from a source of D.C. voltage E1 applied between a pair of terminals 12 and 13.

The circuit also includes a transformer 25 having a pair of secondary windings 28 and 30 and a primary winding 26. The primary winding 26 is centered, tapped and has one of its winding ends terminating in a lead 26a and the other of its winding ends terminating in a lead 26b, the center tap being indicated by the reference numeral 27.

The secondary winding 28 of transformer 25 is provided with a center tap 29, one of its winding ends terminating in a lead 28a and the other of its winding ends terminating in a lead 28b.

The rectifier diode CR2 includes an anode 33 and a cathode 34, the rectifier diode CR3 having an anode 35 and a cathode 36. The transformer lead 26a is connected to the anode 33 of diode CR2 and to the collector electrode 42 of the transistor 40. Transformer 26b is connected to the anode 35 of diode CR3 and to the collector electrode 45 of the transistor 41. The center tap 27 is connected to the emitter electrode 18 of the transistor 16.

The secondary winding lead 28a is connected to the base electrode 44 of transistor 40, secondary winding lead 28b being connected to the base electrode 47 of transistor 41. A capacitor 60 is connected between the center tap 29 and the cathodes 34 and 36 of the diodes CR2 and CR3. A capacitor 61 is connected between the center tap 29 and the collector electrode 17 of the transistor 16. A resistor 62 is connected between the center taps 27 and 29.

The emitter electrode 43 of the transistor 40 and the emitter electrode 46 of the transistor 41 are connected together and to the negative input terminal 13.

A Zener diode CR1 is connected between the base electrode 19 of the transistor 16 and the negative input terminal 13. The collector electrode 17 of transistor 16 is coupled to the positive input terminal 12 by the series combination of a resistor 63 and a diode 64. A resistor 20 is connected between the collector electrode 17 and the base electrode 19 of transistor 16. One end of a resistor 21 is connected to the emitter electrode 19, the other end of the resistor 21 being connected to the cathodes 34 and 36 of the respective diodes CR2 and CR3. A capacitor 23 is connected between the collector electrode 17 of transistor 16 and the negative voltage terminal 13.

The diode 64 provides a half wave rectifier function, the output of the rectifier being passed to a low-pass filter provided by the resistor 63 and capacitor 23. The purpose of this portion of the circuitry is to insure a steady D.C. input to the device. The remainder of the circuitry functions basically in the same manner described in the above-referenced patent application, the transistor 16 and Zener diode CR1 providing a series-shunt regulator, and with the primary winding 26 serving a dual function. In one phase of its operation the winding 26 functions in conjunction with the full-wave rectifier diodes CR2 and CR3. In another phase of the operation of winding 26 it functions as the collector winding which, in conjunction with a base feedback winding (secondary winding 28), produces square wave oscillations by which D.C.-to-D.C. or D.C.-to-A.C. converter action is achieved with a switching oscillator utilizing transistors 40 and 41. The secondary winding 30 of transformer 25 is the output winding and will provide an A.C. output, whereby the circuit is a D.C.-to-A.C. converter. However, the A.C. output appearing across the secondary winding 30 may be rectified to provide a D.C. output, so that the circuit may be operated as a D.C.-to-D.C. converter.

It should be noted that when transistor 41 is conducting that half of the secondary winding 26 between the center tap 27 and the lead 26b (the collector winding for transistor 41) has an induced voltage of such polarity that it adds to the supply voltage. Similarly, when transistor 41 is conducting the other half of the secondary winding 26 between the center tap 27 and the lead 26a (the collector winding for transistor 40) has an induced voltage which adds to the supply voltage. Thus, twice the supply voltage appears across each transistor 40 or 41 during its non-conducting period. Since the supply voltage applied to transformer winding 26 in this instance is the regulated supply voltage (indicated as E2 on the drawing) there is a total voltage of approximately twice E2 appearing across each half of winding 26 when the associated transistor is not conducting. Thus, during the non-conduction of transistor 40 a voltage equal to twice E2 appears on the anode 34 of diode CR2, and similarly during the non-conduction of transistor 41 a voltage equal to twice E2 appears on the anode 36 of diode CR3. Therefore, the potential of the cathodes 34 and 36 of the diodes CR2 and CR3 will be continually maintained at substantially twice the regulated supply voltage E2, this voltage providing the dominant excitation current for the Zener diode CR1 by means of the resistor 21. A minor current is supplied to Zener diode CR1 through the resistor 20 from the source voltage E1 to begin circuit operation. Once started, the current for the Zener diode CR1 is derived from the rectified collector voltages of the transistors 40 and 41 when each of these transistors is in its non-conducting state.

Since the current supply to the Zener diode CR1 in this type of circuit is constant, the resistance value of resistor 20 may be made approximately 20 times greater than in prior art designs since its only function is for starting circuit operation. Therefore, due to the relatively high resistance value of resistor 20, the voltage E2 is substantially independent of the supply voltage E1, i.e., the voltage E2 is well regulated. Of course, the supply voltage E1 must be sufficiently larger than the Zener diode voltage to provide the correct base-collector bias on the series regulator transistor 16. The maximum permissible voltage of E1 is limited only by the collector-base breakdown voltage of the transistor 16.

A resistor 66, indicated in dashed lines on the drawing, can provide additional base-emitter bias for certain types of transistors, and there is also indicated in dashed lines an alternative connection for one lead of the capacitor 61, which will connect that capacitor in shunt with resistor 62, there then being no connection of that capacitor to the collector electrode 17 of the series regulating transistor 16. This indicated alternative embodiment will provide quite satisfactory spike reduction operation, although not as much as the preferred embodiment.

The present invention transient spike reduction circuitry comprises the capacitor 60 and 61, and the resistor 62. Without these components, a transient high voltage spike was found to appear at the leading edge of the square wave generated by the switching circuit. In a practical embodiment, the addition of the spike reduction circuit reduced the amplitude of the transient spike by greater than 80 percent. The capacitance value of the capacitor 60 is determined by the formula $$C = \frac{1}{2\pi f X_c}$$

where the frequency, $f$, is releated to the spike duration by $$f = \frac{1}{2 \text{ (spike duration)}}$$

In the present application the value of capacitance, C, is chosen to be large enough so that the reactance, $X_c$, is less than 100 ohms.

The resistance value of resistor 62 is determined by the following formula:

$$R_{62} = \frac{(E_2 - V_{be})\beta}{I_c(X)}$$

where $V_{be}$ = D.C. base-emitter voltage of transistors 40 or 41,
$\beta$ = current amplification factor ($-55°$ C. of transistors 40 and 41,
$I_c$ = R.M.S. collector current in transistor 40 or 41, and
$X$ = D.C. base drive $\cong 0.8$.

The capacitance value of capacitor 61 is determined by trial and error, after determination of the other component values. As a practical example of the present invention circuitry following is a table of circuit values used with a supply voltage (E1) of 28 volts and using a 2N1711 type transistor for the transistor 16 and 2N930 type transistors for the transistors 40 and 41. The Zener diode CR1 was of a 17.5 volt rating, the diodes CR2, C43 and 64 were type 1N458.

| Component: | Value |
|---|---|
| Resistor 63 _____ohms__ | 221 |
| Resistor 20 _____megohm__ | 1 |
| Resistor 21 _____k. ohms__ | 100 |
| Capacitor 23 _____microfarads__ | .56 |
| Capacitor 60 _____do____ | .022 |
| Capacitor 61 _____do____ | .001 |
| Resistor 62 _____k. ohms__ | 54 |

Although the invention has been described with a certain degree of particularity it is understood that the illustrated embodiment has been presented only by way of example and that numerous changes in the details of construction and combination and arrangement of parts may be resorted to by those skilled in the art without departing from the spirit and scope of the invention as hereinafter claimed.

What is claimed is:

1. In an electronic converter system powered from a source of D.C. potential applied between a high potential terminal and a reference potential terminal and including a square core transformer with a center-tapped primary winding and a center-tapped feedback winding and an output winding, a pair of switching transistors having their collectors connected to opposite ends of said primary winding and their bases connected to opposite ends of said feedback winding and their emitters directly connected to said reference potential terminal, a series regulating transistor having its collector connected to said high potential terminal and its emitter connected to the center-tap of said primary winding, a Zener diode voltage reference device connected between the base of said series regulating transistor and said reference potential terminal, and full-wave rectifier means having its input connected to the collectors of said switching transistors and its output connected to the base of said series regulating transistor, the improvement comprising:

means for reducing the amplitude of a transient voltage spike generated upon the switching of said switching transistors, said means consisting of first capacitance means connected between the output of said full wave rectifier means and the center tap of said feedback winding, resistance means connected between the center tap of said primary winding and the center tap of said feedback winding, and second capacitance means connected between the center tap of said feedback winding and the collector of said series regulating transistor.

2. In an electronic converter system as defined in claim 1, wherein the capacitance value of said first capacitance means is determined by the formula $$C = \frac{1}{2\pi f X_c}$$

where the frequency $(f)$ is related to the spike duration by $$f = \frac{1}{2 \text{ (spike duration)}}$$

and where the capacitive reactance $X_c$ is not in excess of 100 ohms.

3. In an electronic converter system as defined in claim 1, wherein the resistance value of said resistance means is determined in accordance by the formula $$R = \frac{(E_2 - V_{bc})\beta}{I_c(0.8)}$$

where $V_{bc}$ = D.C. base-collector voltage of said switching transistors, $\beta$ = Current amplification factor ($-55°$ C.) of said switching transistors, $I_c$ = R.M.S. collector current in one of said switching transistors, $E_2$ = Regulated D.C. voltage appearing between the emitter of said series regulating transistor and said reference potential terminal.

4. In an electronic converter system as defined in claim 2, wherein the resistance value of said resistance means is determined by the following formula $$R = \frac{(E_2 - V_{be})\beta}{I_c(0.8)}$$

where $V_{be}$ = D.C. base-emitter voltage of said switching transistors, $\beta$ = Current amplification factor ($-55°$ C.) of said switching transistors, $I_c$ = R.M.S. collector current in one of said switching transistors, $E_2$ = Regulated D.C. voltage appearing between the emitter of said series regulating transistor and said reference potential terminal.

5. An electronic converter system powered from a source of D.C. potential applied between a high potential terminal and a reference potential terminal, said system comprising:

(a) a square core transformer with a center tapped primary winding and a center tapped feedback winding and an output winding;

(b) first and second identical switching transistors, each of said switching transistors having a collector electrode and a base electrode and an emitter electrode, the collector electrodes of said switching transistors being connected to opposite ends of said primary winding, the base electrodes of said switching transistors being connected to opposite ends of said feedback windings, the emitter electrodes of said switching transistors being directly connected to said reference potential terminal;

(c) a series regulating transistor having a collector electrode and a base electrode and an emitter electrode, the collector electrode of said series regulating transistor being connected to said high potential terminal, the emitter electrode of said series regulating transistor being connected to the center tap of said primary winding;

(d) a Zener diode voltage reference device connected between the base electrode of said series regulating transistor and said reference potential terminal;

(e) full wave rectifier means having its input connected to the collector electrodes of said switching transistors and its output connected to the base electrode of said series regulating transistor;

(f) first capacitance means connected between the output of said full wave rectifier means and the center tap of said feedback winding;

(g) first resistance means connected between the center tap of said primary winding and the center tap of said feedback winding; and, (h) second capacitance means connected between the center tap of said feedback winding and the collector electrode of said series regulating transistor.

6. The electronic converter system defined in claim 5, wherein said full wave rectifier means comprises a pair of identical rectifier diodes each having an anode and a cathode, said cathodes being interconnected and being coupled to the base electrode of said series regulating transistor, the anode of one of said pair of diodes being connected to one end of said primary winding, the anode of the other of said pair of diodes being connected to the other end of said primary winding.

7. The converter apparatus defined in claim 5, further including second resistance means connected between the collector and base electrodes of said series regulating transistor, and third capacitance means connected between the collector electrode of said series regulating transistor and said reference potential terminal.

8. The converter system defined in claim 5, further including the series combination of a diode rectifier and third resistance means connecting the collector electrode of said series regulating transistor with said high potential terminal.

9. In an electronic converter system powered from a source of D.C. potential applied between a high potential terminal and a reference potential terminal and including a square core transformer with a center-tapped primary winding and a center-tapped feedback winding and an output winding, a pair of switching transistors having their collectors connected to opposite ends of said primary winding and their bases connected to opposite ends of said feedback winding and their emitters directly connected to said reference potential terminal, a series regulating transistor having its collector connected to said high potential terminal and its emitter connected to the center-tap of said primary winding, a Zener diode voltage reference device connected between the base of said series regulating transistor and said reference potential terminal, and full-wave rectifier means having its input connected to the collectors of said switching transistors and its output connected to the base of said series regulating transistor, the improvement comprising:

means for reducing the amplitude of voltage transients generated upon the switching of said switching transistors, said means consisting of first capacitance means connected between the output of said full wave rectifier means and the center tap of said feedback winding, and the parallel combination formed by second capacitance means shunted by resistance means, said parallel combination being connected between the center tap of said primary winding and the center tap of said feedback winding.

10. An electronic converter system powered from a source of D.C. potential applied between a high potential terminal and a reference potential terminal, said system comprising:

(a) a square core transformer with a center tapped primary winding and a center tapped feedback winding and an output winding;

(b) first and second identical switching transistors, each of said switching transistors having a collector electrode and a base electrode and an emitter electrode, the collector electrodes of said switching transistors being connected to opposite ends of said primary winding, the base electrodes of said switching transistors being connected to opposite ends of said feedback windings, the emitter electrodes of said switching transistors being directly connected to said reference potential terminal;

(c) a series regulating transistor having a collector electrode and a base electrode and an emitter electrode, the collector electrode of said series regulating transistor being connected to said high potential terminal, the emitter electrode of said series regulating transistor being connected to the center tap of said primary winding;

(d) a Zener diode voltage reference device connected between the base electrode of said series regulating transistor and said reference potential terminal;

(e) full wave rectifier means having its output connected to the collector electrodes of said switching transistors and its output connected to the base electrode of said series regulating transistor;

(f) first capacitance means connected between the output of said full wave rectifier means and the center tap of said feedback winding; and (g) the parallel combination formed by second capacitance means shunted by first resistance means, said parallel combination being connected between the center tap of said primary winding and the center tap of said feedback winding.

No references cited.

JOHN KOMINSKI, *Primary Examiner.*